Feb. 28, 1961 A. D. PINOTTI 2,972,837
APPARATUS FOR CONTINUOUSLY FORMING TUBING
AND RODS FROM VISCOUS MATERIALS
Filed March 6, 1957 4 Sheets-Sheet 1
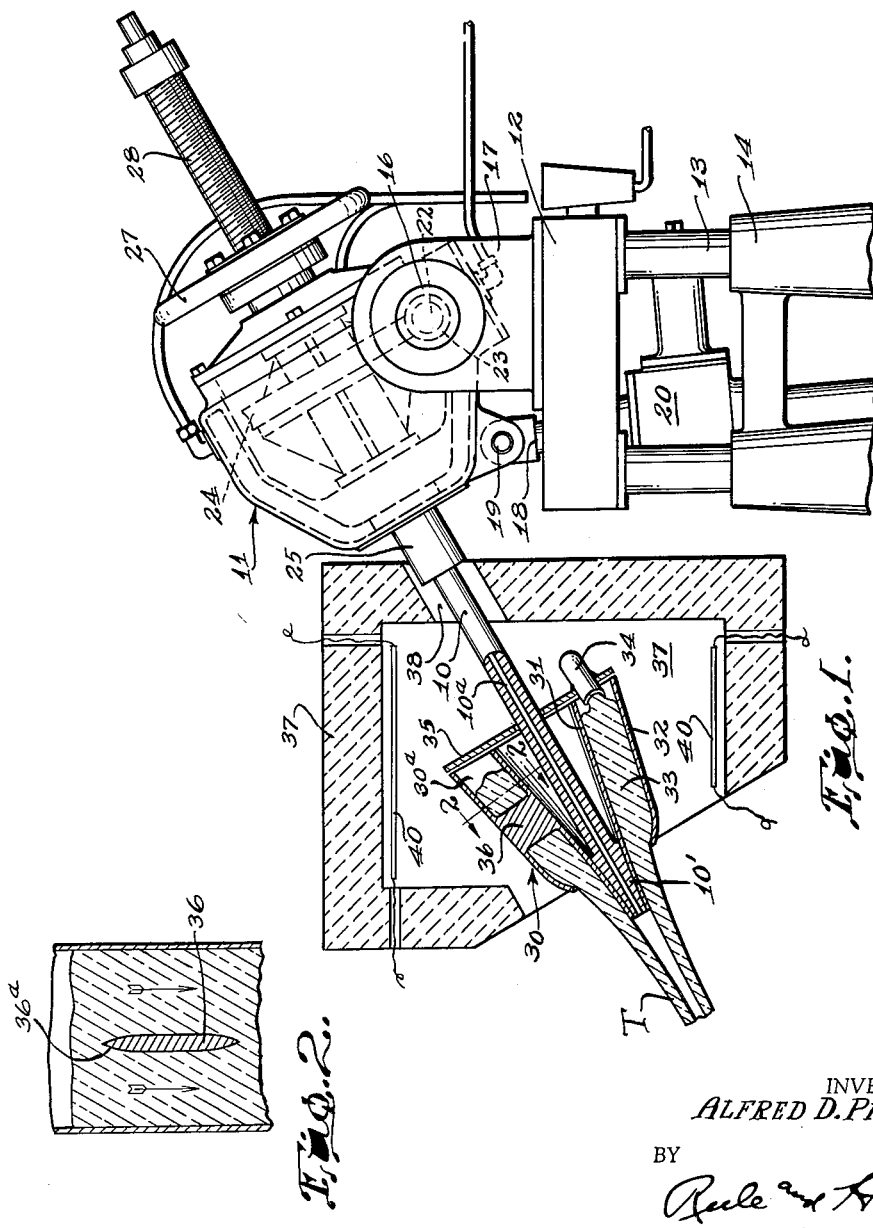
INVENTOR.
ALFRED D. PINOTTI
BY
ATTORNEYS Feb. 28, 1961 A. D. PINOTTI 2,972,837
APPARATUS FOR CONTINUOUSLY FORMING TUBING
AND RODS FROM VISCOUS MATERIALS
Filed March 6, 1957 4 Sheets-Sheet 3

INVENTOR.
ALFRED D. PINOTTI
BY
Rule & Hoge,
ATTORNEYS

INVENTOR
ALFRED D. PINOTTI

United States Patent Office 2,972,837
Patented Feb. 28, 1961

2,972,837

APPARATUS FOR CONTINUOUSLY FORMING TUBING AND RODS FROM VISCOUS MATERIALS

Alfred D. Pinotti, Toledo, Ohio, assignor to Kimble Glass Company, a corporation of Ohio Filed Mar. 6, 1957, Ser. No. 644,409

4 Claims. (Cl. 49—17.1)

My invention relates to the manufacture of tubing and rods from material which, while in a molten or viscous condition, is drawn continuously to form tubing or a solid rod. The material may consist of glass or other thermoplastic materials which, at an elevated temperature, are in a molten or viscous condition and solidify as they are cooled. The invention is herein illustrated and described as used for forming glass tubing or cane, although other materials may be used which come within the scope of my invention.

A primary object of the invention is to provide means by which the transverse shape and dimensions of the tubing or rod may be accurately controlled and made uniform, particularly the outside and inside diameters of the tubing and the wall thickness.

A further object of the invention is to provide apparatus for forming cane or tubing with a surface free from streaks, lines, or other surface defects characteristic of glass drawn by present day methods. As disclosed in the prior art, it is common practice to make glass tubing or rods by flowing a stream of glass onto a rotating mandrel and drawing the glass continuously from the mandrel. In such method, the stream or ribbon of glass is wrapped spirally on the mandrel and, being in a molten condition, the glass convolutions coalesce or merge to form a continuous tube or rod. In such method, there is more or less of a surface chilling of the stream of glass, which prevents a perfect union between the adjoining convolutions of glass so that in the finished product there appears a spiral surface streak or line extending along the glass. The present invention is designed to overcome this defect by drawing the glass from a supply body or pool without winding the glass on a mandrel.

A further object of the invention is to provide an improved means and system of temperature control by which uniform dimensions of the drawn mandrel may be maintained and also by which the drawing operation may be facilitated.

Other objects of the invention will be apparent from the detailed description which is given hereinafter.

In its preferred form, the invention provides a mandrel or rod which is mounted in an inclined position and carries at its lower end a head formed with a chamber or chambers into which a stream or streams of glass flow continuously to maintain a pool of glass from which the tube or cane is continuously drawn. The chamber is provided with an annular outlet orifice through which the molten glass issues and may be provided with additional orifices for the flow of glass from separate compartments for forming a composite tube or cane. The glass from such separate compartments is of a different composition or color. The rotating mandrel and head carried thereby may be of various designs adapted to form rods or tubing of various cross sectional forms and also including composite rods or tubes which may comprise longitudinal stripes of different colors or composition for decoration or functional purposes. The term "rod" as used herein includes both tubing and solid cane except as otherwise indicated.

Referring to the accompanying drawings:

Fig. 1 is a part sectional elevation of one form of apparatus for use in practicing the invention.

Fig. 2 is a detail section at the line 2—2 on Fig. 1, showing a connecting web between the frusto-conical shells.

Figure 3:
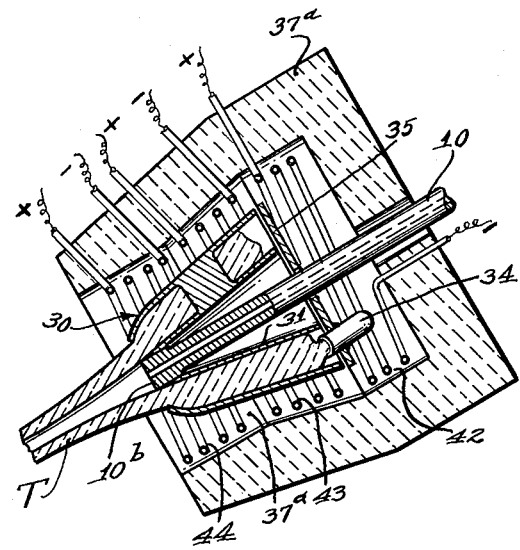
Fig. 3 is a sectional elevation showing a modified form of muffle or chamber.

Referring particularly to Fig. 1, a tubular mandrel 10 is mounted for rotation in a gear case 11. The gear case is supported on a table 12 carried on posts 13, which are mounted in a stationary frame 14. Trunnions 16 on the gear case 11 are journalled in bearing blocks 17 attached to the table 12. The gear case 11 is rotatably adjustable about the axis of the trunnions 16 for adjusting the mandrel 10 about said axis. The means for adjusting the gear case includes a rod 18 connected by pivot 19 to the gear case. Means for moving the rod 18 lengthwise for adjusting the mandrel comprises gearing within a gear box 20 through which the rod 18 extends.

The mandrel 10 is rotated continuously by a motor driven power shaft 22 to which is attached a worm gear 23. A worm wheel 24, driven by the worm gear 23, is keyed to a tubular shaft or sleeve 25. The mandrel 10 extends through the shaft 25 and is rotated thereby. The mandrel is adjustable lengthwise within the shaft 25 by means of a hand wheel 27 on a screw-threaded end portion 28 of the mandrel. The mechanism for mounting, rotating, and adjusting the mandrel as thus far described is disclosed in the prior art.

Attached to the lower, forward end 10′ of the mandrel is a head 30 of generally frusto-conical shape. The head includes an inner frusto-conical shell 31, with downwardly and forwardly convergent walls, and an outer shell 32, concentric with the shell 31. The shells 31 and 32 are shaped to provide an annular chamber 30a or reservoir for a supply body of molten glass from which glass is drawn in the form of a tube T. The chamber 30a also serves as a passageway through which the molten glass 33 flows while being drawn to tubular form. The molten glass flows from the furnace through a tube 34 into the chamber 30a. The tube 34 may extend through an opening in a stationary cover plate 35, which overlies the rotating head 30 and is soldered to the tube 34.

The outer shell 32 is attached to the inner shell 31, in fixed relation thereto, by connecting webs 36 (Figs. 1 and 2). These webs are preferably formed integral with the shells. The shells and connecting webs are made of metal which will withstand the high temperature of the molten glass, such as platinum or platinum-rhodium alloy. The webs 36 are arranged with their major surfaces extending in the direction of flow in the glass. These surfaces may have convergently tapered end portions terminating in knife edges 36a, as shown in Fig. 2, to reduce to a minimum the resistance to the flow of glass. The mandrel 10 is formed with a central bore or opening 10a through which air under pressure is supplied to maintain the tubular form of the glass as it is drawn.

The head 30 is positioned within a muffle or chamber 37. The mandrel may extend through an opening 38 within the wall of the chamber 37. Heat may be supplied within the chamber 37 as by means of electrical heaters 40 mounted on the inner wall surface of said chamber.

Fig. 3 illustrates a modified form of muffler or chamber 37a, which is substantially cylindrical. The tip 10b of the mandrel in this view is substantially cylindrical instead of tapered as the head shown in Fig. 1. Also, the tip 10b terminates at the forward end of the shells 30 and 31.

In order to maintain the required high temperature of the glass within the chamber 30a and adjustably regulate and control the temperatures at different zones within the chamber, an electric heating system is provided. As shown in Fig. 1, electric resistors 40 are mounted within the refractory chamber 37 and may extend along the inner wall surfaces of the chamber. These resistors are connected to any suitable source of current supply. The radiant heat is directed toward the head 30. The current supply may be automatically controlled by a thermostat (not shown).

Fig. 3 illustrates a heating system including a plurality of resistance coils 42, 43, and 44. These coils are in separate electric circuits and are positioned at different points lengthwise of the mandrel, permitting the heat to be applied locally in different zones and to different portions of the head 30, and the glass flowing therethrough. Switches in these circuits permit the coils to be selectively connected to a source of current supply.

Figure 6:
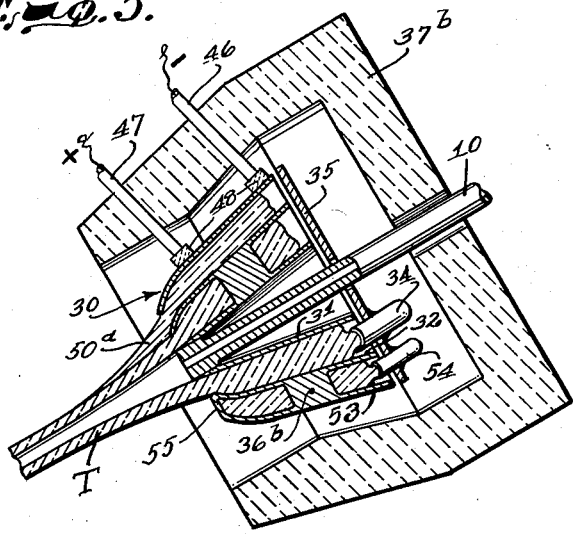
Fig. 6 shows a plurality of concentric frusto-conical shells for making a composite tube.

Fig. 6 illustrates a modified heating system comprising conductors 46 and 47 which extend through openings in the wall of the chamber 37b. Brushes 48, attached to the conductors 46, 47, contact the rotating metal head at different points lengthwise thereof. The metal head functions as a resistor heated by the electric current and thereby supplies heat to the glass within the mandrel head, and also maintains the metal at a sufficiently high temperature to permit a free flow of the glass over the surfaces in contact with the glass. The temperature of the metal may be kept higher than that of the glass flowing thereover.

Figure 4:
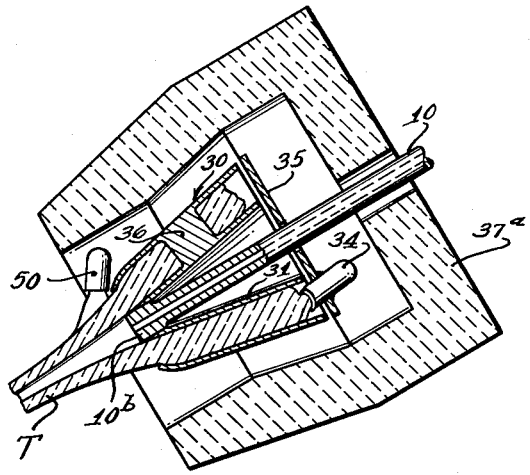
Fig. 4 is a view similar to Fig. 3, showing a further modification including a second glass delivery tube for use in making a composite tube, including a strip of colored or other contrasting glass.

Fig. 4 shows a construction similar to that of Fig. 3, but including a supplemental tube 50 having an outlet opening adjacent the lower end of the head 30, and by which a continuous stream of glass flows on to the tube T. This supplemental glass may be a different composition or different color from that supplied through the tube 34. The glass merges or coalesces with the molten glass forming the tube and appears as a stripe extending lengthwise of the finished tube.

Figure 5:
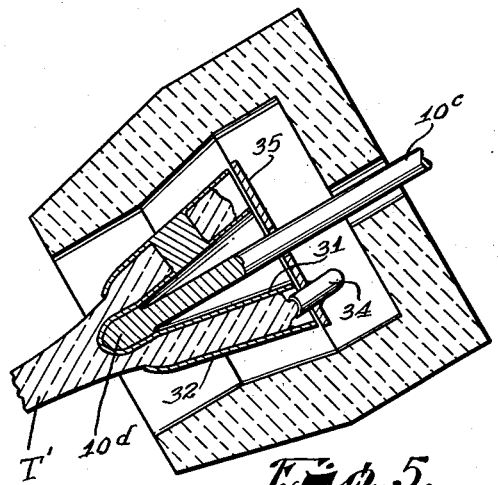
Fig. 5 shows a further modification for use in making a solid cane.

Fig. 5 illustrates a modification for use in drawing a solid rod T'. The mandrel 10c is a solid rod and is formed with a head 10d, with a rounded tip which permits the glass flowing thereover to form a solid rod.

Fig. 6 illustrates a form of apparatus for producing tubing with a strip of colored glass or glass of different composition from that of the tube T. The composite tube may be similar to that above described in connection with Fig. 4. In Fig. 6, an additional frusto-conical shell 53 is provided, surrounding the shell 32 and spaced therefrom to provide an annular chamber or compartment into which glass flows in a constant stream from a tube 54. The glass flowing through this tube is supplied from a separate source from that of the main supply through the tube 34. The outer shell 53 is connected to the shell 32 by integral webs 36b substantially like the webs 36.

Figure 9:
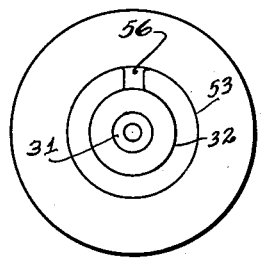
Fig. 9 is a diagrammatic end view of the head shown in Fig. 6.
Figure 7:
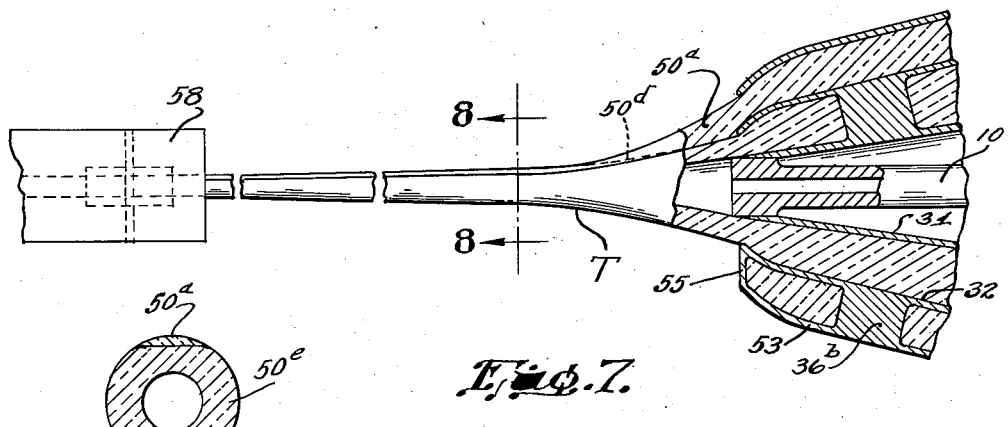
Fig. 7 is a fragmentary sectional view on a comparatively large scale of parts shown in Fig. 6, and also showing tube drawing means.
Figure 8:
Fig. 8 is a section at the line 8—8 on Fig. 7.

The lower end portion 55 of the shell 53 provides a bottom wall or closure for the compartment between the shells 32 and 53. This bottom wall extends through the major portion of the circumference of the shell and is formed within a comparatively narrow or restricted outlet opening 56 (Fig. 9) through which the supplemental stream of glass flows. Figs. 7 and 8 illustrate a method in which the supplemental stream 50a combines with or merges into the main stream. As the glass is drawn forward, the tendency is to assume a perfectly circular form in cross section. As a result, the stream 50a bears down on the glass therebeneath so that, as indicated by the broken line 50d, the supplemental stream is gradually forced downwardly within the circular periphery 50e (Fig. 8) of the composite tube. The glass rod, in all its different forms, is drawn forward by a drawing device 58 (Fig. 7), comprising traction wheels or other conventional means for engaging the hardened glass, applying a constant pull.

Figure 10:
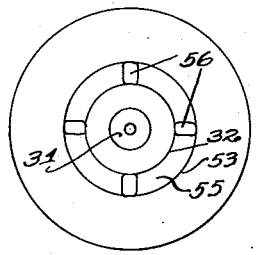
Fig. 10 is a diagrammatic view of a mandrel head designed for forming a composite tube or rod comprising a plurality of decorating stripes extending along the exterior surface of the glass.

Fig. 10 illustrates diagrammatically a modification of the construction shown in Fig. 6. In this modification, the bottom wall 55 is formed with a plurality of outlet openings 56 distributed at different points circumferentially so that the glass issuing therefrom forms a corresponding number of stripes.

Figure 11:
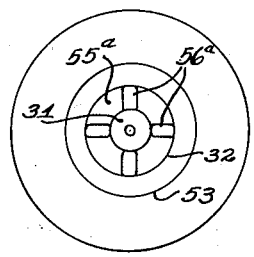
Fig. 11 is a view similar to Fig. 10, showing a modified form of construction for use in applying stripes to the inner surface of the glass tube.

In the form shown in Fig. 11, the bottom wall 55 is omitted so that the main body of glass forming the tube issues from the annular outlet between the shells 53 and 32. In this form of the invention, a bottom wall 55a is formed between the shells 31 and 32. This bottom wall is formed with outlet openings 56a, through which narrow streams of glass flow and merge with the inner wall surface portions of the tubular glass. In this manner, the glass stripes are formed on the inner surface of the tube.

Figure 12:
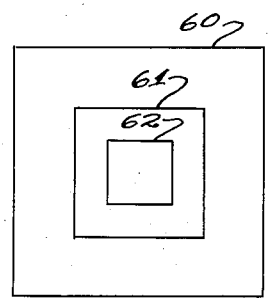
Figs. 12 and 13 illustrate modifications for forming, respectively, rectangular and triangular tubing or rods.

Fig. 12 shows diagrammatically a modification in which shells 60, 61, and 62 are rectangular or square. These shells correspond respectively to the shells 53, 32, and 31 of the other views. This construction provides rectangular outlet openings through which the glass issues, giving a corresponding rectangular form to the tube.

Figure 13:
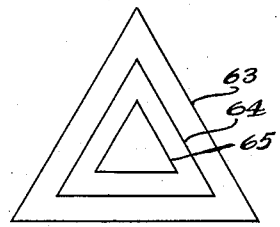

Fig. 13 illustrates a modification comprising concentric triangular shells 63, 64, and 65 designed to give a triangular shape to the tube or rod. Restricted outlets may be provided in connection with this form of shells for use in supplying stripes of colored or other compositioned glass embedded in the tubing or cane in the same manner as above described in connection with the other views.

Modifications other than those herein illustrated and described may be resorted to within the spirit and scope of my invention as defined in the appended claims.

I claim:

1. Apparatus for continuously forming a glass rod, said apparatus comprising a mandrel in the form of a rod, means for mounting said mandrel in a downwardly and forwardly inclined position, means for rotating the mandrel about its axis, a head secured to the lower end portion of the mandrel, said head including a downwardly and forwardly inclined conical inner shell, and a downwardly and forwardly inclined conical outer shell surrounding the inner shell, the walls of said shells being spaced to provide a chamber forming a reservoir for a pool of molten glass, said shells being formed to provide an annular outlet opening at the lower forward end of said head, a stationary cover plate overlying and bridging the upper ends of said shells and substantially closing the chamber between the shells at said upper ends, the cover plate being formed with a central opening through which the mandrel extends and a lateral opening between said shells and a tube extending through said lateral opening into the said chamber, through which tube molten glass is supplied to the chamber.

2. Apparatus for continuously forming glass rod or tubing, said apparatus comprising a mandrel in the form of a rod, means for mounting said mandrel in a downwardly and forwardly inclined position, means for rotating the mandrel about its axis, a head secured to the lower end portion of the mandrel said head including a downwardly and forwardly inclined conical inner shell and a second downwardly and forwardly inclined conical shell surrounding the said inner shell, said shells being spaced-apart to provide a first annular chamber forming a reservoir for a pool of primary molten glass, said shells being formed to provide an annular outlet opening adjacent the lower forward end of said head, a delivery tube for supplying said primary molten glass to said first chamber, a third annular shell surrounding said second shell and having its walls spaced from said second shell to form therewith a second chamber for a second pool of glass, a delivery tube for supplying a secondary molten glass to said second chamber, said second chamber being formed at the lower end thereof with a restricted outlet at one peripheral region of the said head and through which secondary molten glass flows and unites with the primary glass flowing through said annular outlet.

3. Apparatus for continuously forming a glass rod, said apparatus comprising a mandrel in the form of a rod, means for mounting said mandrel in a downwardly and forwardly inclined position, means for rotating the mandrel about its axis, a head secured to the lower end portion of the mandrel, said head including a downwardly and forwardly inclined conical inner shell, and a downwardly and forwardly inclined conical outer shell surrounding the inner shell, the walls of said shells being spaced to provide a chamber forming a reservoir for a pool of molten glass, said shells being formed to provide an annular outlet opening at the lower forward end of said head, means for rigidly connecting the said shells including at least one flat metallic web member extending radially of the mandrel across the chamber in an intermediate region thereof, each of said web members having knife edges extending in a plane radial to the mandrel, a delivery tube for supplying molten glass to an upper region of said chamber, a stationary cover plate overlying and bridging the upper ends of said shells and substantially closing the chamber between the shells at said upper ends, the cover plate being formed with a central opening through which the mandrel extends a lateral opening between said shells, said tube extending through said lateral opening into the said chamber, through which tube molten glass is supplied to the chamber.

4. Apparatus for continuously forming a glass rod, said apparatus comprising a mandrel in the form of a rod, means for mounting said mandrel in a downwardly and forwardly inclined position, means for rotating the mandrel about its axis, a head secured to the lower end portion of the mandrel, said head including a downwardly and forwardly inclined conical inner shell, and a downwardly and forwardly inclined conical outer shell surrounding the inner shell, the walls of said shells being spaced to provide a chamber forming a reservoir for a pool of molten glass, said shells being formed to provide an annular outlet opening at the lower forward end of said head, means for rigidly connecting the said shells including at least one flat metallic web member extending radially of the mandrel across the chamber in an intermediate region thereof, each of said web members having knife edges extending in a plane radial to the mandrel, a delivery tube for supplying molten glass to an upper region of said chamber, a stationary cover plate overlying and bridging the upper ends of said shells and substantially closing the chamber between the shells at said upper ends, the cover plate being formed with a central opening through which the mandrel extends and a lateral opening between said shells, said tube extending through said lateral opening into the said chamber, through which tube molten glass is supplied to the chamber and means for applying localized heat to the said shells comprising electrical resistance heating elements disposed adjacent to said shells for maintaining the temperature of said molten glass.

References Cited in the file of this patent

UNITED STATES PATENTS

| | | |
|---|---|---|
| 1,219,709 | Danner | Mar. 20, 1917 |
| 1,642,312 | Schoonenberg | Sept. 13, 1927 |
| 1,663,093 | Peiler | Mar. 20, 1928 |
| 1,954,732 | Gossler | Apr. 10, 1934 |
| 2,052,269 | Woods | Aug. 25, 1936 |
| 2,155,131 | Hanlein | Apr. 18, 1939 |
| 2,227,357 | Martin | Dec. 31, 1940 |
| 2,390,925 | Danner | Dec. 11, 1945 |
| 2,462,805 | Danner | Feb. 22, 1949 |
| 2,462,807 | Danner | Feb. 22, 1949 |
| 2,474,302 | Danner | June 28, 1949 |

FOREIGN PATENTS

| | | |
|---|---|---|
| 355,599 | Great Britain | Aug. 27, 1931 |
| 750,425 | France | Aug. 10, 1933 |
| 543,172 | Great Britain | Feb. 12, 1942 |